United States Patent [19]

Elwell et al.

[11] Patent Number: 5,114,989
[45] Date of Patent: May 19, 1992

[54] ISOCYANATE-TERMINATED PREPOLYMER AND POLYURETHANE FOAM PREPARED THEREFROM

[75] Inventors: Richard J. Elwell; Robert A. Sewell; Werner A. Lidy; Johan A. Thoen, all of Terneuzen, Netherlands

[73] Assignee: The Dow Chemical Company, Midland, Mich.

[21] Appl. No.: 612,722

[22] Filed: Nov. 13, 1990

[51] Int. Cl.⁵ .................. C08G 18/10; C08L 75/04
[52] U.S. Cl. ........................... 521/159; 521/172; 521/174; 521/167; 521/137
[58] Field of Search ............ 521/159, 172, 174, 167, 521/137

[56] References Cited

U.S. PATENT DOCUMENTS

| | | |
|---|---|---|
| 4,125,487 | 11/1978 | Olstowski ........................ 521/174 |
| 4,256,849 | 3/1981 | Ick et al. ......................... 521/129 |
| 4,292,412 | 9/1981 | Wood ............................... 521/107 |
| 4,379,904 | 4/1983 | Ehrlich et al. ................... 528/65 |
| 4,526,906 | 7/1985 | Wegner ............................ 521/107 |
| 4,569,951 | 2/1986 | Nelson ............................. 521/167 |
| 4,611,044 | 9/1986 | Meyer et al. .................... 521/124 |
| 4,611,083 | 9/1986 | Buethe et al. ................... 521/159 |
| 4,883,825 | 11/1989 | Westfall et al. ................. 521/112 |
| 4,897,431 | 1/1990 | Scherzer et al. ................ 521/172 |

*Primary Examiner*—John Kight, III
*Assistant Examiner*—John M. Cooney, Jr.

[57] ABSTRACT

This invention relates to an isocyanate-terminated prepolymer prepared from a polyisocyanate comprising 4,4'-methylene diphenyldiisocyanate and polyoxyalkylene polyol wherein the polyol has an average functionality of from about 2 to about 4, a hydroxyl equivalent weight of from about 2200 to 3500 and containing oxyethylene residues in from about 40 to about 68 percent by weight; and the use thereof in the manufacturing of flexible polyurethane foam.

7 Claims, No Drawings

ISOCYANATE-TERMINATED PREPOLYMER AND POLYURETHANE FOAM PREPARED THEREFROM

This invention relates to an isocyanate-terminated prepolymer, compositions thereof, and its use in manufacturing polyurethane articles, particularly flexible polyurethane foam.

When preparing flexible polyurethane foam it is frequently advantageous for reasons of system stability, processing and properties of the resulting product to employ isocyanate-terminated prepolymers in manufacturing such foam. Polyurethane foams are generally prepared by intimately mixing under reaction conditions a substance containing isocyanate functional groups with a substance containing functional groups bearing isocyanate-reactive hydrogen atoms. The substance containing isocyanate-reactive hydrogen atoms is generally a polyahl and can be an amine- or imine-terminated polyether polyol, a polyester polyol or especially a polyether polyol. The isocyanate is generally an organic polyisocyanate, especially an aromatic polyisocyanate such as toluene diisocyanate or a (poly) methylene-bridged polyisocyanate such as methylene diphenyldiisocyanate. When preparing flexible, open-celled, polyurethane foam it is advantageous to employ polyisocyanates or polyisocyanate compositions which comprise a significant amount of a diisocyanate thereby limiting the cross-linking within the polymer network and providing for desirable physical properties such as elongation. Especially desirable due to the physical properties of the resulting foam is the use of 4,4'-methylene diphenyldiisocyanate in the manufacture of polyurethane foam.

In the case of methylene-bridged diisocyanates such as methylene diphenyldiisocyanate and especially the 4,4'-isomer, processing problems in the preparation of the foam may be encountered. The 4,4'-isomer is a solid at room temperature and therefore when used in a relative pure state, requires that the preparation of the foam be conducted at elevated temperatures. To overcome this problem, it is known from the art to operate with blends of poly- and/or diisocyanates comprising 4,4'-methylene diphenyldiisocyanate, see for example patent publication U.S. Pat. No. 4,256,849. An alternative means of overcoming this processing inconvenience is to prepare an isocyanate-terminated prepolymer from the 4,4'-methylene diphenyldiisocyanate thereby reducing its tendency to solidify at room or low temperatures.

Isocyanate-terminated prepolymers are generally prepared by reaction of a large molar excess of a suitable isocyanate with an active hydrogen-containing compound. Such active hydrogen-containing compounds are usually difunctional or trifunctional compounds of various molecular weights, and especially polyether polyols. The selection of the active hydrogen-containing compound is made in consideration of the physical properties desired for the resulting foam. For example, when preparing flexible polyurethane foams known as "cold cure" foams use of a polyether polyol comprising oxyethylene residues is desirable. The foams are identified as "cold cure" foams because when removed from the mold the requirement to heat the foam to accelerate the curing of the polymer is no longer necessary. Such "cold-cure" foam can generally be handled in a relatively short period of time without any significant risk of deformation.

Patent publication EP 22,617, describes a process for the manufacture of "cold cure" flexible polyurethane foams by reacting an organic polyisocyanate composition comprising a prepolymer prepared from the reaction of methylene diphenyldiisocyanate with a polyoxyalkylene diol or triol containing from at least 50 weight percent, randomly distributed, oxyethylene residues and having a hydroxyl equivalent weight of from 1000 to 2000. Whilst such a prepolymer essentially overcomes the processing problems associated with 4,4'-methylene diphenyldiisocyanate and provides for a foam with acceptable physical properties it is desirable to improve further the foam properties to meet with more demanding industrial requirements. Particularly, it is desired to improve elongation properties whilst maintaining overall acceptable physical properties such as the extent of cell opening within the foam.

To this effect, the preparation of isocyanate-terminated prepolymers from alternative polyoxyalkylene polyols and their subsequent use in the manufacture of polyurethane foam has been investigated.

SUMMARY OF THE INVENTION

Surprisingly, it has now been found that to obtain improvement of the foam properties, particularly elongation, it is necessary to select the polyoxyalkylene polyol both in consideration of its hydroxyl equivalent weight and also its oxyethylene content.

In a first aspect, this invention is an isocyanate-terminated prepolymer prepared by reacting a polyisocyanate comprising 4,4'-methylene diphenyldiisocyanate in from at least 40 weight percent with a polyoxyalkylene polyol, wherein the polyol has an average functionality of from about 2 to about 4 and a hydroxyl equivalent weight of from about 2200 to about 3500 and contains oxyethylene residues in from about 40 to about 68 percent by weight.

In a second aspect, this invention is a process for the preparation of a polyurethane foam by intimately mixing under reaction conditions components comprising
 (a) polyisocyanate composition containing an isocyanate-terminated prepolymer prepared by reacting a polyisocyanate comprising 4,4'-methylene diphenyldiisocyanate in from at least 40 weight percent with a polyoxyalkylene polyol, wherein the polyol has an average functionality of from about 2 to about 4 and a hydroxyl equivalent weight of from about 2200 to about 3500 and contains oxyethylene residues in from about 40 to about 68 percent by weight; and
 (b) an active hydrogen-containing composition comprising (1) a high equivalent weight isocyanate reactive material, (2) a blowing agent, and (3) a catalyst for promoting the formation of urethane groups wherein component (a) is present in an amount to provide from about 0.6 to about 1.3 isocyanate groups per active hydrogen atom present in component (b).

In yet a third aspect, this invention is an opened-celled polyurethane foam having an average density of from about 10 to about 250 kilograms per cubic meter prepared according to the above process.

DETAILED DESCRIPTION OF THE INVENTION

The isocyanate-terminated prepolymer of this invention is prepared by contacting under reaction conditions a polyisocyanate with a polyoxyalkylene polyol. The prepolymer may be characterized as having an isocyanate content of from about 5 to about 31 weight percent. The isocyanate content of the prepolymer preferably is from about 10, more preferably from about 15, yet more preferably from about 25 and most preferably from about 28 weight percent and up to about 31 weight percent.

The polyoxyalkylene polyol used in the preparation of the prepolymer has an average functionality of from about 2 to about 4, preferably from about 2 to about 3 and most preferably has an average functionality of about 3. By "average functionality" it is understood the number of isocyanate reactive sites per molecule, in the case of polyols, hydroxyl groups, capable of reacting with isocyanate groups. The polyoxyalkylene polyol is further characterized in that it has a hydroxyl equivalent weight of from about 2200 to about 3500 and containing oxyethylene residues in from about 40 to about 68 percent by weight.

Preferably the hydroxyl equivalent weight of the polyol is from about 2300 and more preferably from about 2400 and up to about 3200, more preferably up to about 2800.

The oxyethylene residue content of the polyol preferably is from about 55 and more preferably from about 58 and most preferably from about 60 up to about 65, more preferably up to about 64 percent by weight. An oxyethylene content of the polyol outside these ranges when eventually incorporated into a polyurethane foam may not provide for the desired property characteristics of the resulting foam.

The distribution of the oxyethylene residues within the polyol may be as one or a plurality of blocks either internally or terminally situated on the polyoxyalkylene chain, or alternatively in a random manner throughout the polyoxyalkylene chain of the polyol, or combinations thereof.

The remaining part of the polyoxyalkylene chain when not constituted by oxyethylene residues comprises oxypropylene, oxybutylene residues or mixtures thereof, but especially of oxypropylene residues. Such residues being obtained from reaction of propylene oxide, and butylene oxide respectively. Residues from other oxides may also be present.

Methods of preparing the above described polyether polyols are well known in the art and generally comprise the base-catalyzed addition of the alkylene oxide(s), in this case especially ethylene oxide and propylene oxide, to a di-, tri-, or tetrafunctional initiator at elevated temperatures and pressures.

Suitable initiators include difunctional compounds such as water, ethylene glycol, propylene glycol and higher oxyalkylene adducts thereof, bis-(4-hydroxyphenyl)-2,2-propane and glycol adducts of phthalic anhydride and such like; trifunctional compounds such as trimethylolpropane, hexanetriol and especially glycerine; and tetrafunctional compounds such as ethylenediamine and pentaerythritol.

The preferred initiators due to ready availability and convenient processing are water, ethylene glycol, propylene glycol and their higher oxyalkylene adducts and especially glycerine.

The polyisocyanate used in reaction to prepare the prepolymer comprises 4,4'-methylene diphenyldiisocyanate (MDI) in from at least 40 weight percent. Preferably the polyisocyanate comprises 4,4'-MDI in from about 45, more preferably from about 50, and most preferably from about 52 and up to about 98, more preferably up to about 90 weight percent.

When not constituted by 4,4'-MDI, the remaining part of the polyisocyanate used in reaction to prepare the prepolymer can comprise 2,4'-MDI, 2,2'-MDI, polymethylene polyphenyl polyisocyanates or mixtures thereof. When present, advantageously the 2,4'-MDI does not constitute more than 50 weight percent of the isocyanate used to prepare the prepolymer and the polymethylene polyphenyl polyisocyanate not more than 50 weight percent.

In a preferred embodiment of this invention, the polyoxyalkylene polyol, preferably a triol, is reacted with a polyisocyanate consisting essentially of 4,4'-MDI, 2,4'-MDI and polymethylene polyphenyl polyisocyanate wherein the percent by weight ratio of the 4,4'-MDI to 2,4'-MDI based on total weight of polyisocyanate present is from about 40:40 to about 90:2, preferably from about 50:30 to about 75:10, and more preferably from about 50:25 to about 65:12 percent, the remainder being the polymethylene polyphenyl polyisocyanate.

Exemplary of such a preferred polyisocyanate for use in preparing the prepolymer is that obtained by blending 4,4'-MDI and 2,4'-MDI in a 70:30 weight ratio with a crude methylene diphenyldiisocyanate composition such as, for example, VORANATE* M220 available from the Dow Chemical Company, and containing polymethylene polyphenyl polyisocyanate (approximately 57.5 weight percent), 4,4'-MDI (40 wt. %) and 2,4'-MDI (2.5 wt. %). Combining the 70:30, 4,4'-/2,4'-MDI blend with VORANATE* M220 in for example a 60:40 weight ratio provides a polyisocyanate suitable for use in manufacturing the prepolymer consisting essentially of 4,4'-MDI (about 58%), 2,4' (about 19%) and polymethylene polyphenyl polyisocyanate (about 23%). Such a prepolymer obtained from the preferred polyisocyanate is also suitable for immediate use in the preparation of a flexible polyurethane foam without, for example, any subsequent blending with like or other polyisocyanates.

In a less preferred embodiment, the polyoxyalkylene polyol may be reacted with a polyisocyanate consisting essentially of 4,4'-MDI and 2,4-MDI to provide a prepolymer which is subsequently desired may be blended with like or other isocyanates including crude methylene diphenyldiisocyanate.

When preparing the prepolymer the relative amount of polyoxyalkylene polyol to polyisocyanate is such to provide for a resulting prepolymer having the above mentioned isocyanate content. When preparing the prepolymer the above described polyoxyalkylene polyol optionally may also be used in combination with other isocyanate reactive substances conventionally used in the preparation of isocyanate-terminated prepolymers. Such conventional substances include for example ethylene glycol, propylene glycol, higher oxyalkylene adducts thereof and other polyether polyols not falling within the above description of the polyoxyalkylene polyol.

The prepolymer may be prepared by using conditions that have been described in the prior art for such preparations. Typically, the prepolymer can be prepared by the controlled addition of the polyol to the isocyanate whilst continuously mixing. The rate of addition of the polyol to the isocyanate advantageously is such so as to maintain, if necessary with heating or cooling, a reaction temperature of from about 45° to about 90°, preferably from about 60° to about 80° C.

In the second aspect of this invention, there is provided a process for the preparation of polyurethane foam by intimately mixing under reaction conditions components comprising (a) the prepolymer as described hereinabove optionally as part of a polyisocyanate composition; and
(b) an active hydrogen-containing composition comprising (1) a high equivalent weight isocyanate reactive material, (2) a blowing agent, and (3) a catalyst for promoting the formation of urethane groups wherein component (a) is present in an amount to provide from about 0.6 to about 1.3 isocyanate groups per active hydrogen atom present in component (b).

The high equivalent weight isocyanate reactive material present in component (b) is a compound containing from about 2 to about 8, preferably from about 2 to about 4 isocyanate reactive, active hydrogen atoms, per molecule and which has an average equivalent weight of from about 500 to about 3,000, and preferably from about 800 to about 2,500. Suitable high equivalent weight isocyanate reactive materials include polyamines, polyester polyols and especially polyether polyols. The polyether polyol, may be a polyoxypropylene or a poly(oxypropylene-oxyethylene) polyol or a mixture thereof. Such polyether polyols polyols are well known in the art and many being commercially available. The poly(oxypropylene-oxyethylene) polyol include oxyethylene capped polyoxypropylene polyols and other random or block copolymer obtained by reacting ethylene and propylene oxide with active hydrogen-containing initiators.

Suitable polyether polyols are generally diols and triols having an average hydroxyl equivalent weight of from about 500 to about 3,000, and preferably from about 800 to about 2,500. Exemplary of such polyether polyols are those sold by The Dow Chemical Company under the trademark VORANOL and include, for example, VORANOL 4711, VORANOL 6001, VORANOL 3322 and VORANOL 1421. Other suitable polyols include PHD-, PIPA- or SAN-.type copolymer polyols such as, for example, VORANOL CP-8020.

The blowing agent contained within component (b) is present in an amount to provide the resulting polyurethane foam with an overall density of from about 10 to about 250 kilograms per cubic meter. Advantageously, the blowing agent is present in an amount sufficient to confer to the resulting foam a density of preferably from about 15, more preferably from about 25, and most preferably from about 30 and up to about 100, more preferably up to about 80 kilograms per cubic meter.

In a preferred embodiment of this invention the blowing agent comprises water. Water reacts with isocyanate moities leading to generation of carbon dioxide, the so generated nascent carbon dioxide functions as a blowing agent providing for a cellular structure to the polyurethane.

Typically, the amount of water present providing for sufficient blowing capacity to result in foams with the desired densities is from about 1.0 to about 7 parts by weight per 100 parts by weight of component (b), based on total weight of all constituents present in component (b). Advantageously, such amounts of water are preferably from about 2.5, more preferably from about 3.5 and up to about 6, more preferably up to about 5.5 parts by weight.

In addition to water, small amounts of physical blowing agents may be present when necessary to achieve the desired density. Exemplary of such physical blowing agents which may be present include, for example, methylene chloride, trichlorofluoromethane, dichlorotrifluoroethane, chlorodifluoroethane; hydrocarbons such as pentane and hexane; and entrained gases such as air nitrogen and carbon dioxide.

Suitable catalysts which may be used in the process of this invention to promote the formation of urethane groups include tertiary amines and organometallic compounds especially tin compounds. Exemplary of suitable catalysts are tertiary amine compounds including N,N-dimethylcyclohexylamine, bis(dimethylaminoethyl)ether and 1,4-diazobicyclo[2,2,2]octane; are tin compounds including stannous octoate and dibutyltin dilaurate. Combinations of amine and/or tin compounds as catalyst may advantageously be employed in the process.

In the process of this invention component (a) is present in an amount sufficient to provide from about 0.6 to about 1.3 isocyanate groups per active hydrogen atom present in both component (b). Preferably, the amount of component (a) is such so as to provide from about 0.8 and up to about 1.15, more preferably up to about 1.05 isocyanate groups per active hydrogen atom. The amount of isocyanate present may also be expressed in terms of an "isocyanate reaction index". In this case, an isocyanate reaction index of 100 corresponds to 1.0 isocyanate group per active hydrogen atom.

Other conventional components which optionally, but advantageously are present in the process, include surfactants for example, siloxaneoxyalkylene copolymers such as products sold under the trademark Tegostab by Th. Goldschmidt including B-4113 and B-4690; chain extending agents such as, for example, ethylene glycol, 1,4-butanediol, diethanolamine, diisopropanolamine and polyamine; fillers; fire-retardants, for example, melamine; pigments, dyes and such like.

The components of the foam-forming reaction may be mixed together in any convenient manner, for example, by using any of the mixing equipment described in the prior art for the purpose. If desired non interreactive components may be preblended so as to reduce the number of component streams which require intimate mixing with each other. It is generally advantageous to use a two-stream system whereby one stream comprises prepolymer and optionally any additional polyisocyanate, whilst the second stream comprises all other components of the reaction mixture and which essentially do not interreact prior to mixing with the isocyanate stream.

The process of the invention and the isocyanate-terminated prepolymer is particularly useful in the preparation of polyurethane foams especially "cold-cure" foams. Such foams are suitable for many application areas including upholstery, sound and vibration damping and cushioning.

Use of the prepolymers of this invention in the preparation of polyurethane foams provides for foams exhibiting an enhanced degree of elongation compared to foams obtained from reaction of art known prepolymers.

The invention is illustrated by the following Examples in which all parts and percentages are by weight, unless otherwise stated.

Prepolymers are prepared according to the procedure further described and evaluated by preparing flexible polyurethane foam using the polyol formulation given below. The polyurethane foam is prepared by intimately mixing the isocyanate, prepolymer, with the polyol formulation using a high pressure foaming machine.

Polyol Formulation 100 parts glycerine-initiated polyoxypropylene-oxyethylene (15% cap)polyol; molecular weight 6000
3.75 parts water
0.8 part triethylenediamine (33% in dipropylene glycol)
0.15 part Catalyst NIAX-A1 supplied by Union Carbide Co.
0.8 part Surfactant, Tegostab B4113 supplied by Th Goldschmidt Ag.

Physical properties of the resulting molded foams prepared by mixing reaction components under high pressure conditions and introducing the reacting mass into a mold thermostated to 50° C. are reported. Test procedures employed to measure the physical properties as reported are for tensile strength and elongation- DIN 53571; compression load deflection (CLD)- DIN 53577; and for indentation load deflection (ILD)- DIN 53576.

Prepolymer 1

An isocyanate-terminated prepolymer having an isocyanate content of 29 weight percent is prepared by reacting 11.1 parts of a polyoxyethylene-oxypropylene triol (hydroxyl equivalent weight 2463; oxyethylene content 61% ,randomly distributed) with 100 parts of an isocyanate blend constituted of 4,4'-MDI(58%), 2,4'-MDI (19%) and polymethylene polyphenyl polyisocyanate (23%).

The polyol is added to the isocyanate blend whilst continuously mixing at a rate such to maintain a reaction temperature of between 65° to 70° C. When the entire amount of the polyol has been added the resulting reaction mixture is stirred at the same temperature for a further 1 hour to ensure completion of reaction.

Properties of foams obtained by reacting the so prepared prepolymer with the identified polyol formulation are given below.

|  | Foam 1 | Foam 2 | Foam 3 |
| --- | --- | --- | --- |
| Isocyanate Reaction Index | 90 | 100 | 100 |
| Free-rise density (Kg/m$^3$) | 36 | 36 | / |
| Molded density (Kg/m$^3$) | 44.4 | 44.9 | 45.2 |
| Elongation (%) | 143 | 133 | 119 |
| Tensile Strength (kPa) | 117 | 138 | 181 |
| CLD (kPa) | 3.56 | 4.44 | 6.43 |
| ILD (N) | 150 | 195 | 260 |

PREPOLYMER 2

An isocyanate-terminated prepolymer having an isocyanate content of 29 weight percent is prepared by the same procedure as for Prepolymer 1, by reacting 11.0 parts of a polyoxyethylene-oxypropylene triol (hydroxyl equivalent weight 2270; oxyethylene content 59%, randomly distributed) with 100 parts of an isocyanate blend constituted of 4,4'-MDI(58%), 2,4'-MDI (19%) and polymethylene polyphenyl polyisocyanate (23%).

Properties of foams obtained by reacting the so prepared prepolymer with the identified polyol formulation are given below.

|  | Foam 4 | Foam 5 | Foam 6 |
| --- | --- | --- | --- |
| Isocyanate Reaction Index | 90 | 100 | 110 |
| Molded density (Kg/m$^3$) | 44.7 | 44.4 | 44.5 |
| Elongation (%) | 130 | 125 | 118 |
| Tensile Strength (kPa) | 134 | 152 | 180 |
| CLD (kPa) | 4.34 | 5.41 | 6.44 |

COMPARATIVE PREPOLYMER A

A comparative prepolymer having an isocyanate content of 29 weight percent is prepared, by the same procedure as for Prepolymer 1, by reacting 10.8 parts of a polyoxyethylene-oxypropylene triol (hydroxyl equivalent weight 1670; oxyethylene content 72%, randomly distributed) with 100 parts of an isocyanate blend constituted of 4,4'-MDI(58%), 2,4'-MDI (19%) and polymethylene polyphenyl polyisocyanate(23%).

|  | Foam A* | Foam B* | Foam C* |
| --- | --- | --- | --- |
| Isocyanate Reaction Index | 90 | 100 | 110 |
| Free-rise density (Kg/m$^3$) | 38 | / | / |
| Molded density (Kg/m$^3$) | 45.7 | 45.6 | 45.5 |
| Elongation (%) | 120 | 115 | 99 |
| Tensile Strength (kPa) | 122 | 140 | 159 |
| CLD (kPa) | 3.81 | 4.77 | 5.89 |
| ILD (N) | 150 | 190 | 240 |

*Not an example of this invention

COMPARATIVE PREPOLYMER B

A comparative prepolymer having an isocyanate content of 29 weight percent is prepared, by the same procedure as for Prepolymer 1, by reacting 11.1 parts of a polyoxyethylene-oxypropylene triol (hydroxyl equivalent weight 2670; oxyethylene content 70%, randomly distributed) with 100 parts of an isocyanate blend constituted of 4,4'-MDI(58%), 2,4'-MDI (19%) and polymethylene polyphenyl polyisocyanate(23%).

|  | Foam D* | Foam E* |
| --- | --- | --- |
| Isocyanate Reaction Index | 90 | 100 |
| Molded density (Kkg/m$^3$) | 47.8 | 46.8 |
| Elongation (%) | 117 | 103 |
| Tensile Strength (kPa) | 118 | 143 |

|  | Foam D* | Foam E* |
| --- | --- | --- |
| CLD (kPa) | 4.12 | 5.08 |

*Not an example of this invention

Foams 1 to 6 show the enhanced elongation performance that can be obtained with the prepolymers of this invention relative to comparative prepolymers.

What is claimed is:

1. An isocyanate-terminated prepolymer prepared by reacting a polyisocyanate comprising 4,4'-methylene diphenyldiisocyanate in from at least 40 weight percent with a polyoxyalkylene polyol, wherein the polyol has an average functionality of from about 2 to about 4 and a hydroxyl equivalent weight of from about 2200 to about 3500 and an oxyethylene content of from about 40 to about 68 percent by weight.

2. The prepolymer of claim 1 wherein in the polyisocyanate comprises 4,4'-methylene diphenyldiisocyanate in from about 50 to about 90 weight percent.

3. The prepolymer of claim 2 wherein the polyisocyanate additionally comprises 2,4'-methylene diphenyldiisocyanate and optionally a polymethylene polyphenyl polyisocyanate.

4. The prepolymer of claim 1 wherein the polyoxyalkylene polyol has an hydroxyl equivalent weight of from about 2300 to about 3200 and an oxyethylene content of from about 58 to about 65 percent by weight.

5. The prepolymer of claim 4 wherein the polyisocyanate comprises 4,4'-methylene diphenyldiisocyanate and 2,4'-methylene diphenyldiisocyanate and optionally polymethylene polyphenyl polyisocyanate and wherein the relative weight percent of 4,4'- and 2,4'-methylene diphenyldiisocyanate present is from about 40:40 to about 90:2 percent with remainder being the polymethylene polyphenyl polyisocyanate.

6. A process for the preparation of a polyurethane foam by intimately mixing under reaction conditions components comprising (a) polyisocyanate composition containing an isocyanate-terminated prepolymer prepared by reacting a polyisocyanate comprising 4,4'-methylene diphenyldiisocyanate in from at least 40 weight percent with a polyoxyalkylene polyol, wherein the polyol has an average functionality of from about 2 to about 4 and a hydroxyl equivalent weight of from about 2200 to about 3500 and an oxyethylene content of from about 40 to about 68 percent by weight; and (b) an active hydrogen-containing composition comprising (1) a high equivalent weight isocyanate reactive material, (2) a blowing agent, and (3) a catalyst for promoting the formation of urethane groups wherein component (a) is present in an amount to provide from about 0.6 to about 1.3 isocyanate groups per active hydrogen atom present in component (b).

7. An opened-celled polyurethane foam having an average of from about 10 to about 250 kilograms per cubic meter prepared according to the process of claim 6.

* * * * *